Sept. 16, 1969 — W. T. DUERDOTH — 3,467,779

OSCILLATOR SYNCHRONISATION IN DIGITAL COMMUNICATIONS SYSTEMS

Filed Aug. 5, 1966 — 5 Sheets-Sheet 1

WINSTON T. DUERDOTH,
INVENTOR

BY Hall & Houghton
ATTORNEY

Sept. 16, 1969 W. T. DUERDOTH 3,467,779

OSCILLATOR SYNCHRONISATION IN DIGITAL COMMUNICATIONS SYSTEMS

Filed Aug. 5, 1966 5 Sheets-Sheet 2

WINSTON T. DUERDOTH,

INVENTOR

BY

ATTORNEY

Sept. 16, 1969 W. T. DUERDOTH 3,467,779

OSCILLATOR SYNCHRONISATION IN DIGITAL COMMUNICATIONS SYSTEMS

Filed Aug. 5, 1966 5 Sheets-Sheet 3

WINSTON T. DUERDOTH

INVENTOR

BY Hall & Haughton

ATTORNEY

WINSTON T. DUERDOTH
INVENTOR

BY [signature]

ATTORNEY

WINSTON T. DUERDOTH
INVENTOR

BY [signature]
ATTORNEY 3,467,779
OSCILLATOR SYNCHRONISATION IN DIGITAL COMMUNICATIONS SYSTEMS

Winston Theodore Duerdoth, 70 Evelyn Ave., Ruislip, England

Filed Aug. 5, 1966, Ser. No. 570,538
Claims priority, application Great Britain, Aug. 17, 1965, 35,203/65
Int. Cl. H04j 3/06
U.S. Cl. 179—15 14 Claims

ABSTRACT OF THE DISCLOSURE

This specification describes a time division multiplex pulse code modulation system including a plurality of stages intercoupled by transmission paths, the stages having timing oscillators which must be synchronised with one another. Each transmission path at its connection to a signal input to a stage has a digit storage means or aligner by means of which digits incoming to the stage are synchronised with the timing oscillator of the stage. Associated with each digit storage means is a control signal generator which produces two types of control signal, one type when the storage means is nearly empty of digits and the other type when it is nearly full. The control signals from the generator are applied to control the frequencies of the timing oscillator of the local stage and the timing oscillator of the stage at the other end of the transmission path concerned, the senses of control being such as to tend to keep the digit storage means roughly half full of digits. Each timing oscillator has an input circuit for the control signals which inhibits a change of frequency of the oscillator in response to a control signal if control signals calling for an increase and a decrease in frequency are present simultaneously.

Figure 1:
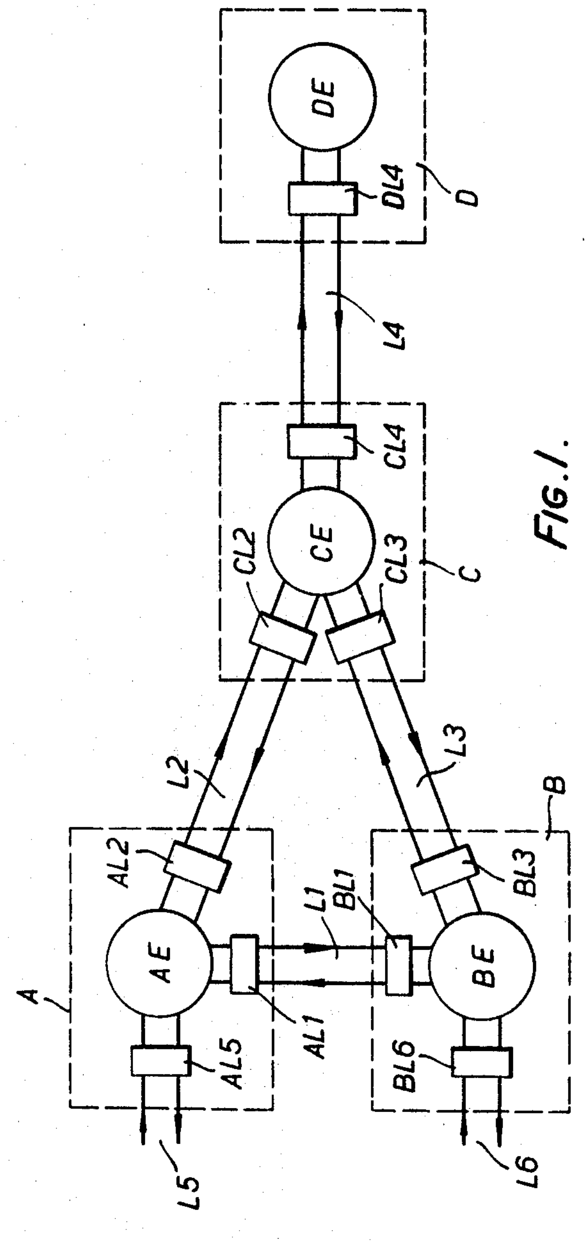

This invention relates to oscillator synchronisation in digital communications systems, and especially but not exclusively to time division multiplex (t.d.m.) pulse code modulation (p.c.m.) communications systems, in which information, for example speech, is coded in digital form for transmission.

In a multi-channel p.c.m. system information for a particular channel is coded by use of digits selected from a number of digits constituting a code group. The digits representing coded information of the respective channels are transmitted in each of a succession of time-frames. Each time frame is constituted by a number of time slots containing a number of digit periods dependent on the mode of assembling digital information from the channels for transmission. In one mode, each channel is allocated the same time slot in each time frame and each time slot contains a number of digit periods equal to or exceeding the number of digits in one code group.

In the particular case of a 24-channel system using an 8-digit p.c.m. code, each time frame has 24 time slots each containing 8 digit periods (i.e. up to 8 digits can be transmitted in each slot), each slot being allocated to a particular channel identified by the position of the time slot in the frame. One or more slots can be used for transmission of frame synchronising and/or control signals, in digital form.

The invention is particularly concerned with multiplexed digital transmission systems comprising a network of interconnected switching stages for routing digital information in frames of several different incoming transmission paths to frames of outgoing transmission paths. For example, a digital telephone system can have a number of interconnected switching stages (telephone exchanges) each connected to several multiplexed p.c.m. transmission systems. Each switching stage is required to select the digits of a time slot of a channel of an incoming system and to transfer them to the corresponding digit periods of the time slot of an appropriate channel of an outgoing system. In general, the digits of a slot of an incoming system will need to be transferred to digit periods of a different time slot of an outgoing system, involving delaying transmission of the digits through the switching stage. Difficulties arise in such switching operations since incoming information from the several systems will normally have travelled over transmission paths of differing lengths so that each path has a different transmission delay and, in addition, variations in transmission delays may be introduced by temperature variations in the case of cable links. As a result of these transmission delays, the frame starting times of the several systems connected to a particular switching stage will differ thereby making design of the stage complex. In addition, if each switching stage has its own timing oscillator determining the digit, slot and frame periods of the p.c.m. systems going out from it, then the digit rates of the several systems incoming to a switching stage may differ, again complicating the operation of the switching stages.

In order to facilitate the design of the switching stage of such a transmission network, it is preferable that the incoming systems to a particular stage are synchronised, i.e. the digit rates of the incoming systems are all the same and the frames of all the incoming systems are in time alignment (i.e. the systems have identical frame starting times).

British patent specification No. 968,730, discloses a receiver for a p.c.m. transmission system which brings the incoming time frame into time alignment with the time frame of the receiving stage (exchange) by introducing an appropriate transmission delay into the incoming path. Each receiver has a timing oscillator (one for each incoming system), operating at the incoming digit rate, which can be used to generate the digit, time slot and time frame frequencies. Whilst the aligning apparatus described in that specification can absorb the limited variations in the frame starting times which are produced by the variations in delay of the transmission cable due to temperature, it cannot cope with the continuous relative changes due to differences in the frequencies of the exchange oscillators at the ends of the transmission system. For this reason, such aligning apparatus cannot successfully be used to attain the desired synchronisation of an incoming system to a switching stage as discussed in the preceding paragraph.

According to the present invention, a switching stage for a digital communications system, for example a time division multiplex pulse code modulation communication system, has a master timing oscillator the frequency of which is adjustable by control signals, digit storage means operable under control of the master timing oscillator and incoming digits to absorb differences between incoming digit times and local digit times generated by the master timing oscillator, and means responsive to the state of fill of the storage means approaching the full and empty conditions temporarily to apply, respectively, a frequency increasing or a frequency decreasing control signal to an input control circuit of the master timing oscillator and to transmit in an outgoing channel slot from the stage a frequency decreasing or frequency increasing control signal, respectively, and means for receiving from an incoming channel time slot a frequency increasing or frequency decreasing control signal and for applying such control signal to the input control circuit of the master timing oscillator, the input control circuit being effective to adjust the frequency of the master oscillator only when one or more control signals of one sense are received in the absence of a control signal of the opposite sense.

The switching stage can also include means connected to apply to the master timing oscillator frequency locking signals derived from the incoming digits to the stage.

In a digital communication system, according to the invention, a plurality of interconnected switching stages each has a local timing oscillator the frequency of which is adjustable by control signals, each switching stage including for each incoming path a separate digit storage means operable under control of the local timing oscillator and of incoming digits to that stage on the path concerned to absorb differences between the incoming digit times and local digit times determined by the local timing oscillator, and means operable to apply, respectively, a frequency increasing or frequency decreasing control signal to an input control circuit and the local timing oscillator of that stage when any of the storage means is adjacent to the full condition or adjacent to the empty condition and concurrently to transmit a frequency decreasing or increasing control signal, respectively, only to the switching stage at the remote end of the incoming path concerned. The arrangement is such that if in a switching stage frequency increasing and frequency decreasing control signals exist concurrently in a switching stage, the frequency of the local timing oscillator of the stage is not changed. Such a system can also include, for each switching stage, means for applying control signals derived from incoming digits to that stage to lock the frequency of the local timing oscillator from the frequencies of the timing oscillators of the other switching stages in the system.

The available storage capacity of the digit storage means associated with a particular incoming path at any stage is indicative of the degree of misalignment of the frame start of that stage relative to the frame start of the switching stage at the remote end of that path. Detection of conditions of the storage means, adjacent full and adjacent empty conditions is used to correct such misalignment by applying a control signal, i.e. timing oscillator frequency adjusting signals, in one sense to that stage and in an opposite sense to that stage at the remote end of the path. Assuming that both such control signals are effective, the frequencies of the timing oscillators of the stages concerned are adjusted in senses tending to adjust the frame starts of the stages thereby resulting in modification of the available capacity of the storage means and thereby removal of the control signals. The operation is repeated until realignment is achieved and maintained.

The storage means of a stage may include a number of toggle circuits conveniently equal in number to the number of digits in the transmission code, the incoming digits to a particular stage being written in to the store under control of the incoming digit p.r.f. and read out from the store under control of the locally generated digit p.r.f. The incoming digits are subjected to a transmission delay in the storage means determined by a comparison between the incoming digit times and the locally generated digit times. The predetermined conditions of the storage means can be detected by a coincidence circuit responsive to coincidence between the first digit in an incoming time slot and the second and penultimate digits of a locally generated time slot, the former coincidence indicating that the storage means is nearly empty and the latter coincidence condition that it is nearly full. Under such conditions the detector generates appropriate control signals; one of these is fed to the local oscillator control circuit where it may operate a control unit responsive to the presence of a frequency increasing or a frequency decreasing control signal, but not to concurrent presence of both, to adjust the oscillator frequency. The other control signal is transmitted to the directly connected switching stage, for example as digital information in digit periods of a frame synchronizing time slot, for application to the control circuit of the timing oscillator of the directly connected switching stage.

A digital communications system comprising a network of interconnected switching stages embodying the invention can be operated so that temporary shifts in the frame start of any particular stage does not disturb the normal operation of the network. In addition, additional switching stages can be added to an existing network, isochronous networks can be interconnected, and individual stages within a network can be taken out of action and subsequently restarted with a minimum of disturbance to the operation of the remainder of the network.

Figure 2:
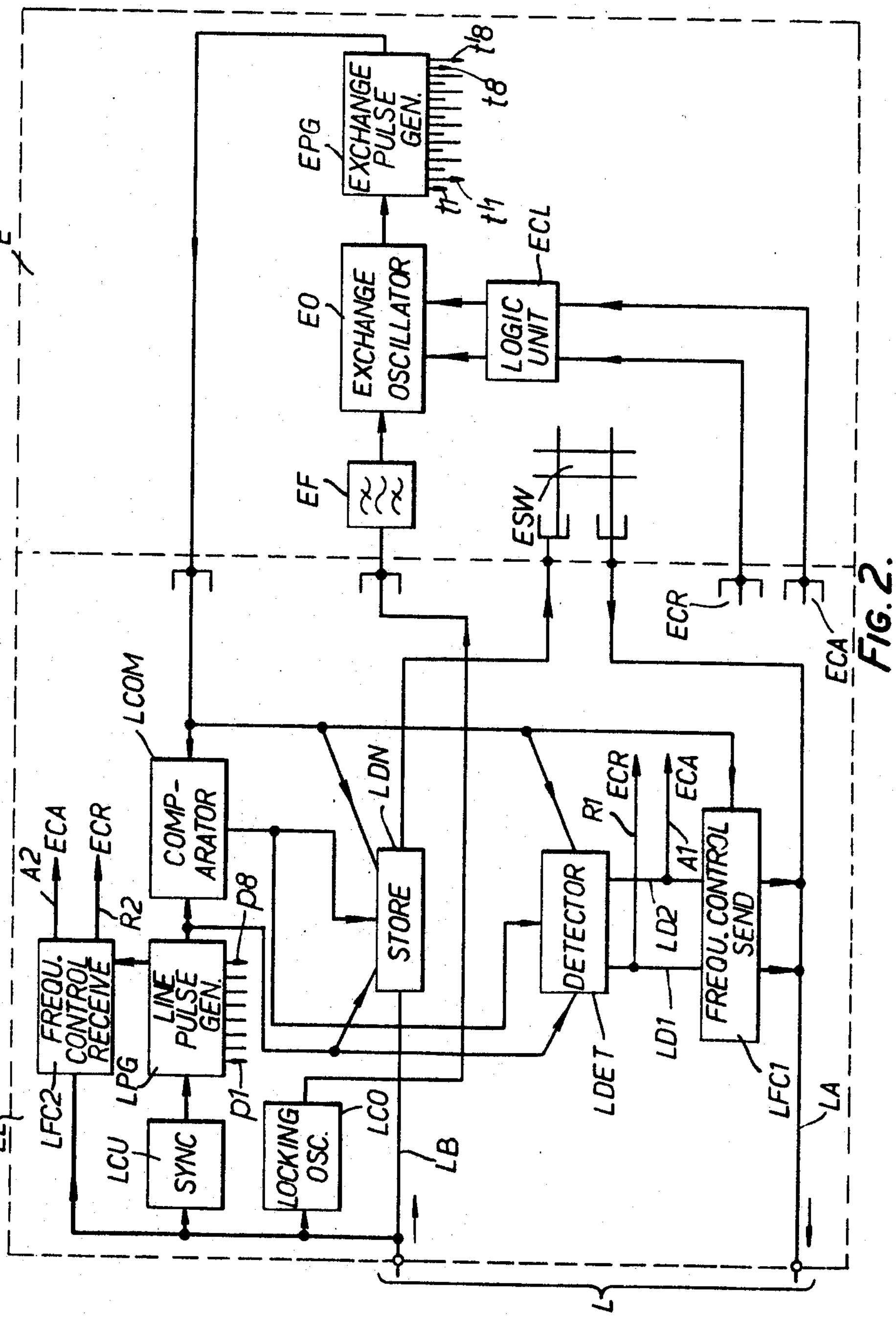
Figures 3, 4, 6:
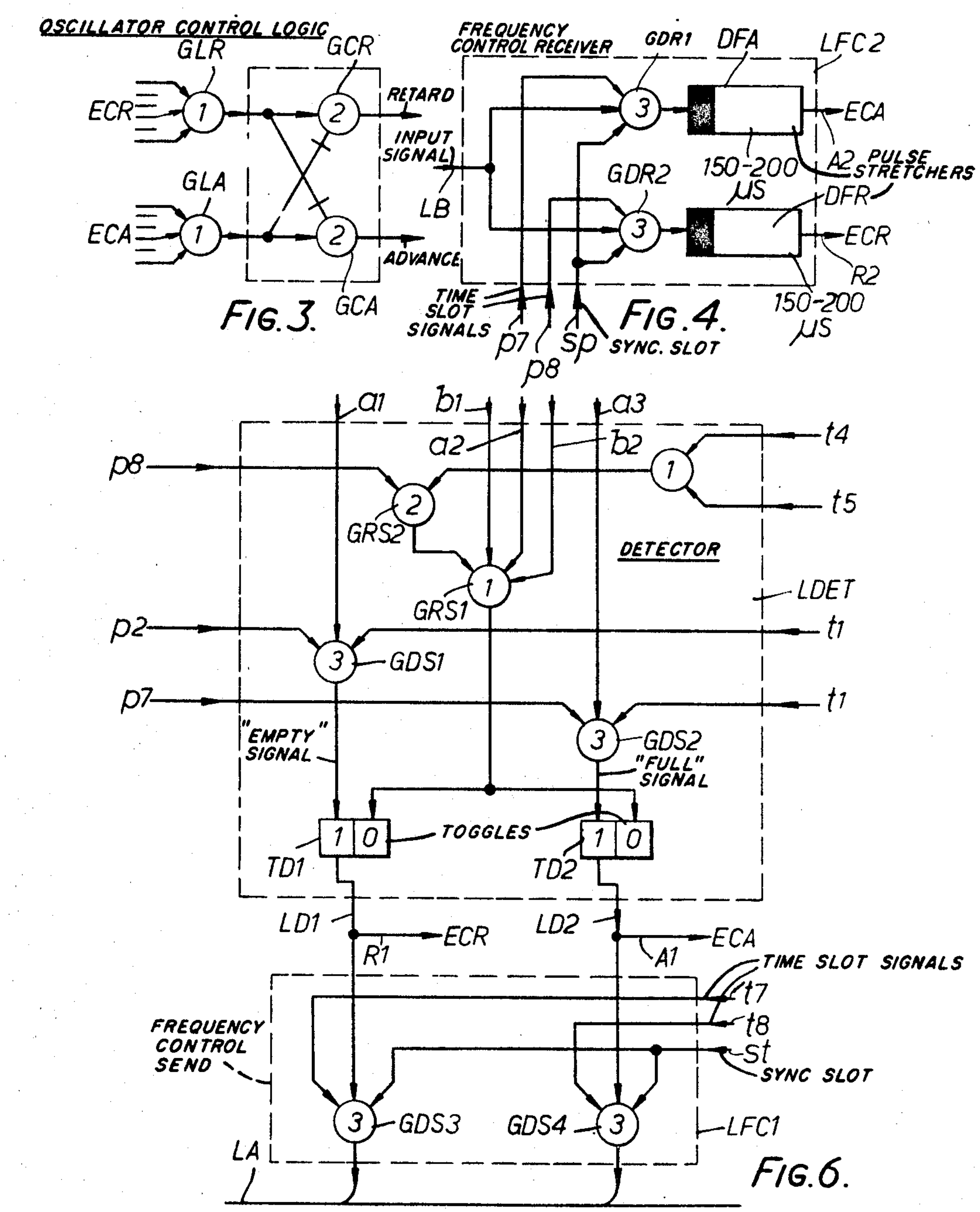
Figure 5:
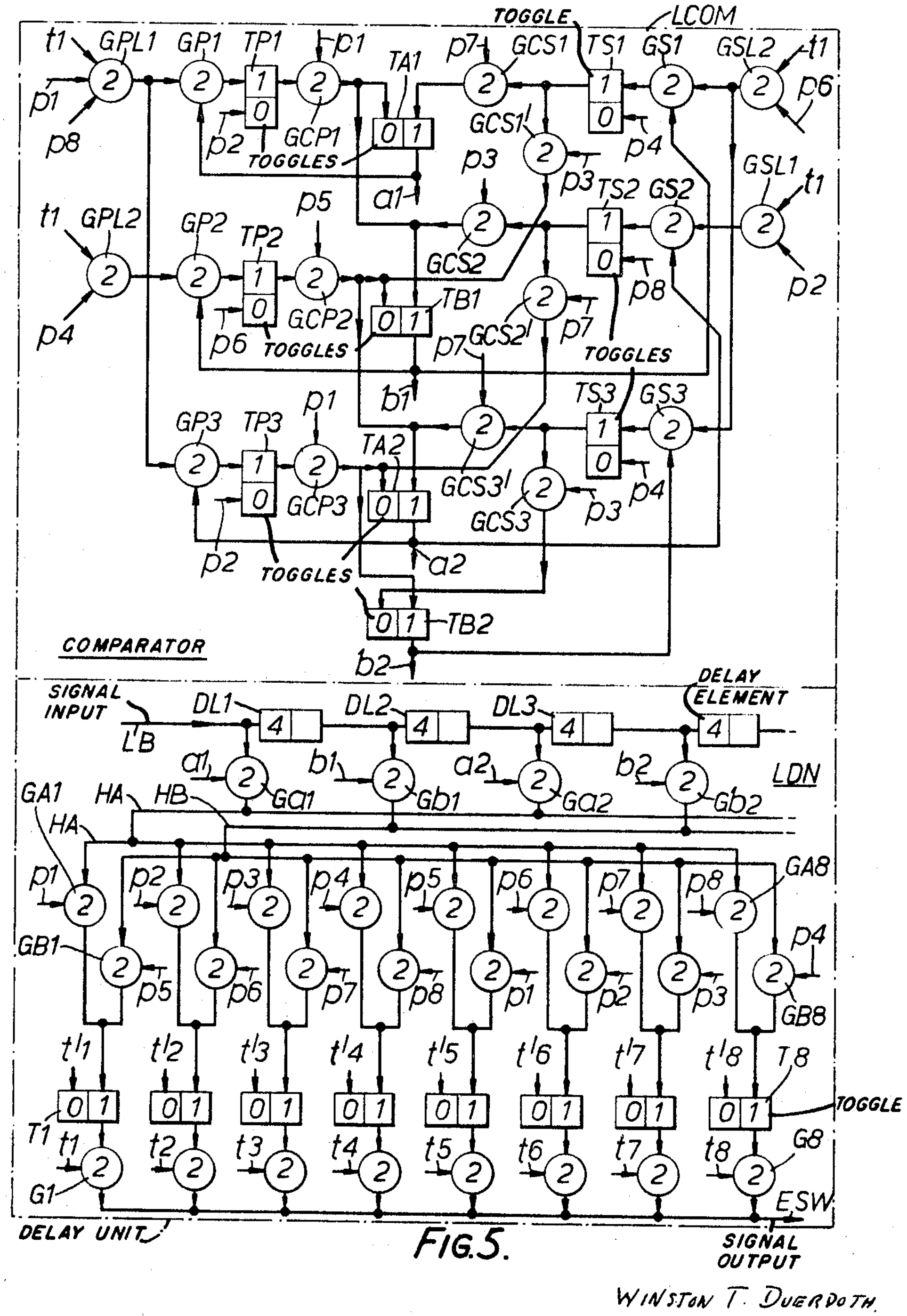
Figure 7:
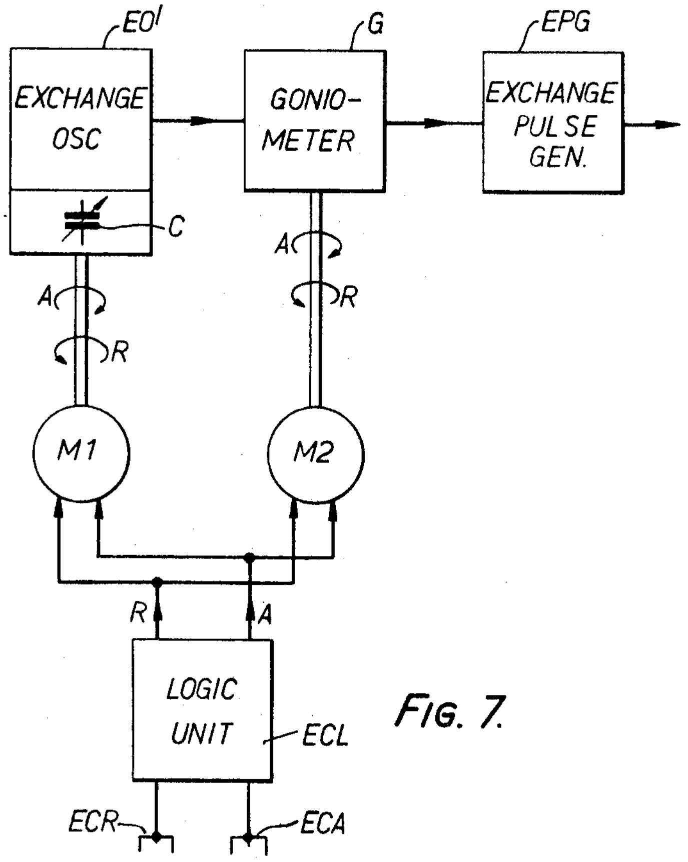

By way of example, the invention will be described in greater detail with reference to the accompanying drawings, in which:

FIG. 1 shows diagrammatically several switching stages interconnected to form part of a digital communications system, FIG. 2 is the schematic circuit of part of the switching stages of FIG. 1 and illustrating the invention, FIG. 3 is a logical circuit of the control logic unit ECL shown in FIG. 2, FIG. 4 is a logical circuit of the control unit LFC2 shown in FIG. 2, FIG. 5 is a logical circuit of the comparator unit LCOM and the delay network LDN shown in FIG. 2, FIG. 6 is a logical circuit of the detector LDET and the control unit LFC1, and FIG. 7 shows, schematically, an alternative form of local timing oscillator and control circuit to that shown in FIG. 2.

FIG. 1 shows part of a digital communication system, to be described as a p.c.m. telephone system, having four interconnected telephone exchanges (switching stages) A, B, C and D. The system illustrated shows exchanges A and B directly connected to each other by a two-way link L1 and also to exchange C by two-way links L2 and L3. Exchange C is also directly connected to the exchange D by a two-way link L4. Exchanges A and B also have links L5 and L6 for connecting them to other parts of the system.

Each exchange has exchange equipment E (designated AE, BE, CE, DE respectively) common to all the links directly connected to that exchange and in addition has line equipments individual to each link directly connected to it. The line equipments of each stage are identified by the combination of the relevant exchange and link designations, e.g. exchange C has line equipments CL2, CL3, CL4.

FIG. 2 shows the parts of an exchange equipment E and of one of the line equipments EL relevant to the invention, it being understood that these equipments will include additional components as is normal in the art.

The digital exchange equipment E shown in FIG. 2 has a master local timing oscillator EO which operates at the digit pulse repetition frequency (p.r.f.). The various timing waveforms required to operate the digital exchange are all derived from the oscillator EO by a pulse generator EPG and serve to determine the timing of the slots and of digits within the slots. Assuming that the system is a 24-channel system using an 8-digit p.c.m. code, then the oscillator EO and the pulse generator EPG together define all the 8 digit periods, comprising digit pulse periods *t1* . . . *t8*, and the 24 slot periods including a time synchronising slot *st*. In addition it determines the frame start time of the exchange.

The exchange equipment also has a switching network ESW for switching transmissions to and from the exchange with or without slot changing, as required, for which purpose it is connected by appropriate means (not shown) to the outgoing line LA of a link L and via the line equipment EL to the incoming line LB of the link L.

The timing oscillator EO is a variable frequency oscillator electronically controllable by signals derived from two sources. Firstly, a control input can be applied via a bandpass filter EF. This control input is a sinusoidal locking signal derived by addition of sine waves at the digit p.r.f. of each incoming transmission to the exchange so that the oscillators EO of a system of interconnected exchanges are frequency locked and have a common mean digit rate. However, these frequencies derived from the incoming transmission systems will be continuously changing in relative phase depending on the phase of the oscillators at the remote ends of the transmission system and on changes of delay in the transmission systems. Thus whilst their combination which is used as a locking signal to the local oscillator will control its frequency for much of the time, occasions will occur when the amplitude of their combination is insufficient to provide a locking signal and the local oscillator will return to its natural frequency. The bandpass filter EF serves to restrict the locking signal to a suitable bandwidth, for example ±5 parts in a million of the nominal frequency of the oscillator EO. The oscillator EO has a second control input path including a logic network ECL and input terminals ECA and ECR connected to line equipment EL in a manner to be described later. The effect of signals applied separately to terminals ECA or ECR is to actuate the logic network ECL to apply to the oscillator EO signals which increase or decrease, respectively, the oscillator frequency by a predetermined amount, e.g. 50 parts per million, for the duration of the control input, this frequency change being outside the range of locking provided by the signal applied via the filter EF. On termination of such a control input condition, the oscillator frequency returns to that determined by the control input over the filter EF. In the event of concurrent control inputs to terminals ECA and ECR, the logic network ECL does not cause a change in the frequency of the oscillator EO.

The logic network ECL may take the form illustrated in FIG. 3, inputs from terminals ECA and ECR being applied, respectively, via gates GLA and GLR as priming inputs to coincidence gates GCA and GCR and as inhibiting inputs to gates GCR and GCA. The outputs of gates GCA and GCR are connected to appropriate inputs of the oscillator EO. The network operates as indicated by the truth table below:

| GLA output | GLR output | GCA output | GCR output |
|---|---|---|---|
| 0 | 0 | 0 | 0 |
| 1 | 0 | 1 | 0 |
| 0 | 1 | 0 | 1 |
| 1 | 1 | 0 | 0 |

The line equipment EL shown in FIG. 2 includes an oscillator LCO to which incoming signals on the line LB are applied to lock it to the p.r.f. of the incoming digits. The oscillator LCO generates a sinusoidal output dependent on the incoming digit p.r.f. and this output is fed to the bandpass filter EF of the exchange equipment E, there acting as a constituent of the locking control signal applied to the oscillator EO.

Signals on the incoming line LB include frame synchronising signals which may be contained in a time slot *st* allocated to synchronsing of each incoming frame. In the particular example being described, the synchronising time slot contains up to six digit periods used to denote the start of a frame, the other two digit periods being used for controlling the frequency of the exchange oscillator EO over the terminals ECA and ECR, as will be described.

Signals on the incoming line LB will be subject to a transmission delay dependant on the length of the line LB and also on the temperature of the line. Thus, although the local timing oscillator EO is locked to the corresponding oscillators of other exchanges in the system via the transmission links, the frame start times of incoming transmissions on the line LB will normally not coincide with those of the local exchange equipment as determined by the oscillator EO. The invention provides means for controlling the oscillators such as EO so that in conjunction with limited storage capacity aligners the frames of all the incoming information are kept in alignment with the locally generated frames.

To this end, the line equipment EL includes a variable transmission delay network LDN connected in series with the incoming line LB. The range of transmission delay provided by the network LDN is related to the length of the line LB and also to the range of expected temperature variation of the line. The amount of the available delay inserted in series with the line LB is determined by a comparator LCOM. The comparator LCOM is controlled by inputs from the exchange equipment pulse generator EPG and further control inputs from a pulse generator LPG which generates pulses, *p1 . . . p8*, at the digit frequency of the incoming transmission with which it is synchronised by control unit LCU. The latter receives an input from the incoming line LB and the frame start of an incoming transmission is determined by response of the control unit LCU to the synchronising signals in incoming synchronising time slots *sp*.

Incoming digits on the line LB are written into the variable delay network LDN under control of the pulse generator LPG operating at the incoming digit p.r.f. and subjected to a delay determined by time comparison of the incoming and locally generated digit rates in the comparator LCOM. The digits written into the delay network LDN are subsequently read out under control of the exchange pulse generator EPG at the locally generated digit p.r.f. and fed to the exchange switching network ESW. The frame start of the transmission leaving the delay network LDN thus is in alignment with that of the exchange.

The proportion of the total delay of the delay network LDN that is actually inserted in series with the incoming line LB provided a sensitive indication of the phase of the exchange frame start, determined by the oscillator EO and pulse generator EPG, relative to that of the frame start of the incoming transmission, determined by control unit LCU and the pulse generator LPG.

If the digit p.r.f. of the incoming transmission on the line LB is somewhat higher than the locally generated digit p.r.f., then the delay provided by the network LDN would reach a maximum. If the digit p.r.f. of the incoming transmission is somewhat lower than that of the locally generated digit p.r.f., the delay provided by the delay network LDN eventually reduces to zero. Any variations of the incoming digit p.r.f. beyond those resulting in the maximum and minimum delays of the network LDN being utilised, cause loss of information contained in the incoming digits.

These limiting situations are avoided by detecting conditions of the delay network LDN adjacent empty and full conditions indicative of phase displacement between the local and incoming frame starts, and utilising such detection to generate signals for counteracting such displacement.

In FIG. 2 a detector LDET is connected to the comparator unit LCOM to detect predetermined conditions of the variable delay unit LDN adjacent empty and full conditions. The detector generates control signals on output lines LD1 and LD2 respectively, upon detection of these predetermined conditions, an output on line LD1 being applied via lead R1 to the control terminal ECR, and an output line LD2 via lead A1 to the control terminal ECA, of the exchange equipment E, respectively, to decrease or increase the frequency of the timing oscillator EO for as long as an output signal is generated by the detector LDET. The output lines LD1 and LD2 also are connected to provide inputs to a frequency control network LFC1. This network when actuated generates digital control signals at the two digit periods (frequency control periods) of the synchronising time slot not used for synchronising purposes. By way of example, it will be assumed that in response to an input from lead LD1, the network LFC1 generates a control signal represented by the code 10 whereas in response to an input signal on lead LD2 it generates a control signal represented by the code 01. These coded control signals are fed from the control network LFC1 to the outgoing line LA of the exchange equipment E.

Information contained in the frequency control periods of the synchronising time slots of incoming transmission on line LB is recognised by a frequency control unit LFC2 which has output leads R2 and A2 connected respectively to the control terminals ECR and ECA of the exchange equipment E. When actuated by a frequency control signal identified by code 10 at the frequency control digit periods of the synchronising time slot, the control unit LFC2 generates an output on the lead A2, whereas a frequency control signal identified by code 01 causes the control unit LFC2 to generate an output on the lead R2.

One form of the control unit LFC2 is shown in FIG. 4 and comprises a pair of coincidence gates GDR1 and GDR2 connected respectively to leads A2 and R2 by pulse stretching elements DFA and DFR, each providing a delay of about 150–200 μs. The gates GDR1 and GDR2 each requires three concurrent priming inputs for it to open. Each gate is connected to receive inputs from the line LB and for the duration of each incoming time synchronising slot *sp*. In addition, gate GDR1 receives a third input at the digit pulse time (*p*7) of each frame generated by the pulse generator LPG whilst gate GDR2 receives a third input at the final digit pulse time (*p*8) of each frame generated by pulse generator LPG.

A frequency increasing signal (coded 10) incoming to the control unit LFC2 at digit times *p*7, *p*8 of a time synchronising pulse (*s*S*p*) thus has the increase signifying bit gated by gate GDR1 at digit time *p*7 and stretched by the element DFA, the stretched pulse appearing on lead A2 and being applied to the advance terminal ECA. A frequency decreasing signal (coded 01) incoming to the control unit LFC2 at digit times *p*7, *p*8 of a time synchronising pulse has the decrease signifying bit gated by the gate GDR2 at digit time *p*8 and stretched by the element DFR before application to retard terminal ECR over lead R2.

If the detector LDET is actuated as a result of the comparator unit LCOM reaching a condition corresponding to the predetermined condition of the delay network LDN adjacent an empty condition it will generate an output of lead LD1. This output is fed to control terminal ECR of the exchange equipment E causing the logic unit ECL to apply a control signal to the timing oscillator EO, decreasing its frequency by the predetermined amount, 50 parts per million, for retarding the frame start of the exchange equipment E. The output on lead LD1 also actuates the frequency control network LFC1 to generate a frequency corrective signal coded 10 which is transmitted over line LA in the synchronising time slot, to the line equipment connected to the distant end of line LA where it causes the frequency control unit LFC2 of that line equipment to generate an output of its lead A2. This output is applied via terminal ECA of the distant exchange equipment to cause its control logic unit ECL to feed a frequency increasing control signal to the timing oscillator EO of the distant exchange for advancing the frame start of that exchange. In the event of the detector LDET being actuated as a result of the comparator LCOM reaching a condition corresponding to the predetermined condition of the delay network LDN adjacent the full condition it causes application of a frequency increasing signal to the local exchange timing oscillator, for advancing the local exchange frame start, and a frequency decreasing signal coded 01 to be sent in a synchronising time slot to the exchange timing oscillator at the distant end of line LA for retarding the distant exchange from start. Such action is necessary since the detector LDET detects only an out-of-phase relation between the local and distant exchange frame starts and does not detect which exchange oscillator is causing the condition. Compensating control signals are therefore applied to the oscillator of both local and distant exchanges until the condition in the relevant network LDN is removed from the predetermined conditions adjacent the empty or the full condition.

Although this corrective action has been described in relation to a local exchange connected to one distant exchange, it will be appreciated that the local exchange equipment may have more than one associated line equipment by which it is connected to several distant exchanges, as indicated by the commoned connections in FIG. 2. In the event that control signals exist concurrently on terminals ECR and ECA, the control logic unit ECL does not generate an output.

Examples of particular circuits for the comparator unit LCOM and the delay network LDN are shown in FIG. 5 which is a logic diagram of those items.

The delay network functions by processing incoming pulses from the line LB to bring an incoming time slot (S*p*) into leading overlapping relationship with a locally defined time slot (S*t*) under control of the comparator unit LCOM. With the incoming and locally generated time slots so related, the two time slots partially coincide with the digit periods of the incoming time slot occurring earlier than corresponding digit periods of the locally generated time slot. This processing is achieved by introducing, if necessary, discrete delays in series with the line LB prior to gating the incoming digits into a temporary store under control of digit pulses *p*1 . . . *p*8 generated by the pulse generator LPG. The stored pulses are subsequently read out and fed to the switching network ESW under control of locally generated pulse, *t*1 . . . *t*8 generated by the pulse generator EPG.

The delay network LDN has a chain of delay elements DL1, DL2, DL3 . . . to which the line LB is connected, each delay element providing a transmission delay equal to four digit periods, i.e. half a time slot. Associated with the delay elements are gates G*a*1, G*b*1, G*a*2, G*b*2 . . . the outputs of gates G*a*1, G*a*2 . . . being connected to a highway HA and the output of gates G*b*1, G*b*2 . . . being connected to a highway HB. The comparator unit LCOM functions, in a manner to be described later, to generate outputs *a*1, *b*1, *a*2, *b*2 which are applied as priming inputs to the respective gates G*a*1, G*b*1, G*a*2 to open appropriate ones of those gates to bring the incoming time slots into the aforesaid leading overlapping relationship with locally generated time slots. This is achieved either by inserted none, one or more of the delay elements in series with the line LB.

The highway HA is connected to a set of gates GA1 . . . GA8 primed by locally generated digit period pulses *p*1 . . . *p*8 respectively and the highway HB is connected to a set of gates GB1 . . . GB8 primed by locally generated digit period pulses displaced by four digit periods from those applied to the corresponding gates GA1 . . . GA8. The outputs from corresponding pairs of GA and GB gates, e.g. GA1, GB1, are commoned and connected to setting inputs of corresponding toggles in a chain of toggles T1 . . . T8. The toggles constitute digit storage elements of the nework LDN. The toggles are read by respective output gates G1 . . . G8 primed by digit period pulses *t*1 . . . *t*8 respectively, generated by the pulse generator EPG. The outputs of gates G1 . . . G8 are connected in common to the exchange switching network ESW, shown in FIG. 2. The toggles T1 . . . T8 can be reset by inputs *t*1′ . . . *t*8′, respectively, which are generated by the pulse generator EPG. The pulses *t*1 . . . *t*8 and *t*1′ . . . *t*8′ appear in corresponding digit periods, the *t* pulses appearing in the first half of the digit periods and the *t*′ pulses in the latter half of the digit periods. The writing pulses for the toggles T1 . . . T8

(e.g. $p1$ or $p5$ for toggle T1) must be displaced from the reading pulses (e.g. $t1$ for toggle T1) and the use of the $t'$ pulses for resetting the toggles permits this displacement to be reduced to one digit period.

The selection of the gates G$a$1, G$b$1, G$a$2, G$b$2 . . . is controlled by the comparator LCOM which is responsive to coincidences of certain of the pulses $p1$ . . . $p8$ (generated by the pulse generator LPG in response to incoming digit pulse trains) and the first pulse, $t1$, of each train of pulses $t1$ . . . $t8$ generated by the pulse generator EPG. The comparator unit has toggles TA1, TB1, TA2, TB2, one for each of the gates G$a$1, G$b$1, G$a$2, G$b$2 of the delay network LDN. It also has addition priming gates GP1 . . . GP3 with associated output toggles TP1 . . . TP3 and addition control gates GCP1 . . . GCP3; subtraction priming gates GS1, GS3 with associated toggles TS1 . . . TS3 and pairs of subtraction control gates GCS1 . . . GCS3 and GCS1′ . . . GCS3′; and limit detecting gates GPL1, GPL2, GSL1, GSL2.

Assuming that the comparator unit LCOM is generating a pulse $b1$, i.e. the toggle TB1 is set, thereby priming gate G$b$1 of the delay network LDN so that the delay element DL1 is connected in series with the line LB to bring incoming time slots into leading overlapping relation with respective time slots generated by the pulse generator EPG. The digits $p1$ . . . $p8$ in an incoming time slot pass from the delay element DL1 via gate G$b$1 to the highway HB where they appear at times $p5$ . . . $p8$ . . . $p4$ respectively due to the four digit delay of the delay element DL1. These digits are thus passed by gates GB1 . . . GB8, primed by pulses $p5$ . . . $p8$ . . . $p4$ and stored in the toggles T1 . . . T8, being read out subsequently by pulses $t1$ . . . $t8$ applied gates G1 . . . G8. The temporarily stored digits are thus read out and passed to the exchange switching network ESW under control of the pulses $t1$ . . . $t8$ generated by the pulse generator EPG. The toggles T1 . . . T8 are reset by the pulses $t1'$ . . . $t8'$ ready to receive the digits of the next incoming time slot.

If now the incoming digits arrive at the comparator LCOM earlier relative to corresponding digits generated by the pulse generator EPG, the toggles T1 . . . T8 absorb the change by increasing displacement between writing and reading times until a limit of seven digit periods displacement is reached occurring, say, when the eighth digit period of a time slot, as it appears at the output of gate GB8 (i.e. at time $p4$) coincides with the first digit period ($t1$) of the corresponding time slot generated by the pulse generator EPG. The comparator unit responds to this condition by detection of the coincidence at gate GPL2 of a $p4$ pulse and a $t1$ pulse. The resultant output from gate GPL2 sets the toggle TP2 via the gate GP2 (primed by pulse $b1$ from toggle TB1) and the next $p$ pulse, $p5$, applied via gate GCP2 (primed by toggle TP2) sets the toggle TA2 to its "1" state and resets toggle TB1. With toggle TA2 set, an output $a2$ is applied to gate G$a$2 of the delay network LDN so that, since toggle TB1 has been reset, delay elements DL1 and DL2 are inserted in series with the incoming line LB. In the comparator unit LCOM, gates GP3 and GS2 are primed instead of gates GP2 and GS1 and the next $p$ pulse, $p6$, resets toggle TP2.

Incoming digit pulses are now fed from the line LB to the delay network LDN via delay elements DL1 and DL2 and gate G$a$2 on to highway HA. The digit pulses appearing on highway HA are displaced by eight digit periods (one time slot) and are ready into the toggles T1 . . . T8 via gates GA1 . . . GA8 by pulses $p1$ . . . $p8$, being read out by pulses $t1$ . . . $t8$.

It will be appreciated that following insertion of an additional delay element (DL2 in this instance) the last four digits to have been written into their respective toggles will again be written into the same toggles four digit periods later. For example, if delay element DL1 is introduced at time $p1$, the digits written into toggles T1 . . . T4 from highway HB via gates GB1 . . . GB4 at the preceding times $p5$ . . . $p8$, will reappear on highway HA four digit periods later at times $p1$ . . . $p4$ and therefore be again written into toggles T1 . . . T4 via gates GA1 . . . GA4. This overwriting permits the pulse generator EPG, in effect, to catch up by four digit periods and no loss or mutilation of the digits occurs.

On continuing earlier arrival of incoming digits at the comparator LCOM, compared with the corresponding digits generated by the pulse generator EPG, the gate GPL1 eventually detects coincidence of a $t1$ pulse with a $p8$ pulse and the resultant output from gate GPL1 sets the toggle TP3 via gate GP3 (primed by the output from toggle TA2) and on the next $p$ pulse, $p1$, the toggle TB2 is set via gate GCP3 (primed by toggle TP3) and toggle TA2 is reset. The output $b2$ from the toggle TB2 primes the gate G$b$2 in the delay network to insert delay elements DL1, DL2 and DL3 in series with the line LB, incoming digits then again being fed, after delay, to the highway HB for writing into the toggles T1 . . . T8 via gate GB1 . . . GB8.

Assuming now that the delay elements DL1 and DL2 are again inserted alone in series with the line LB and the gate G$a$2 primed on input $a2$ from the toggle TA2 of the comparator LCOM. If the incoming digits to the unit LCOM now commence to arrive later relative to corresponding digits generated by the pulse generator EPG, the resultant difference in writing and reading of toggles T1 . . . T8 will accommodate such later arrival unit a limit of one digit period between writing and reading is reached which will occur, say, when the second digit of an incoming time slot as it appears on highway HA, coincides with the first digit period of the time slot generated by the pulse generator EPG. The comparator unit LCOM responds to this condition by detecting coincidence between a $p2$ pulse and a $t1$ pulse in gate GSL1. Since the gate GS2 is primed (by the set toggle TA2), the output from gate GSL1 sets the toggle TS2, thereby priming gates GCS2 and GCS2′. The next occurring $p$ pulse, $p3$ sets toggle TB1 via primed gate GCS2 and the output $b1$ from toggle TB1 primes gate G$b$1 in the delay network LDN. The toggle TA2 is not reset until pulse time $p7$ via primed gate GCS2′ so that, in the meantime, gate G$a$2 in the network LDN remains primed to permit overwriting as previously described. At pulse time $p8$, the toggle TS2 is reset. Incoming digits on the line LB now pass through delay element DL1 and gate G$b$1 to highway HB from which they are written into and read out from the toggles T1 . . . T8 as previously described.

If the incoming digits continue to arrive progressively later relative to the corresponding digits generated by the pulse generator EPG, then difference in writing and reading times of the toggles T1 . . . T8 copes until a one digit difference occurs, to which condition the comparator unit responds by detecting coincidence between a $p6$ pulse and a $t1$ pulse in gate GSL2. The output from gate GSL2 sets the toggle TS1 (since gate GS1 is primed by the output $b1$ of the set toggle TB1) which primes gates GCS1 and GCS1′. The next $p$ pulse, $p7$, sets the toggle TA1 to prime the gate G$a$1 in the network LDN and four digit periods later, pulse $p3$ resets the toggle TB1 via gate GCS1′. The delay element DL1 is then removed and incoming digit pulses to the delay network LDN are fed via gate G$a$1 (primed by the output $a1$ from the toggle TA1 in the comparator LCOM) to the highway HA and temporarily stored in the toggles T1 . . . T8 as previously described.

Incorporation of the delay elements DL1, DL2, DL3 in the delay network LDN provides for a wide variation in temperature changes of the transmission links and between the frequencies of the exchange oscillators. In circumstances where such variations will not be so large, the delay elements can be omitted, the incoming digits being written into the toggles at the incoming digit rate and read out at the locally generated digit rate, the delay between writing and reading of the toggles T1 . . . T8 being used to align the incoming and locally generated digits. Normally, in a system employing 8 digits per time slot as described above, eight toggles are adequate but if a rather wider margin of delay is required the number of toggles can be increased.

FIG. 6 shows, in logical circuit form, a particular example of suitable circuits for the detector LDET and the associated control unit LFC1 in FIG. 2. In the form of the detector illustrated, it is assumed that it operates in conjunction with a delay network LDN having three delay elements, DL1, DL2, and DL3.

The detector LDET has a pair of toggles TD1 and TD2 that can be set via three-coincidence gates GDS1 and GDS2, respectively, and reset by a resetting input common to both toggles from a gate GRS1. The output from the toggle TD1 is connected to lead LD1 and an input to a gate GDS3, the output of which is connected to the line LA. The output from the toggle TD2 is connected to lead LD2 and also as an input to a gate GDS4 the output of which is also connected to the line LA.

Reverting to operation of the comparator and control units LCOM and LDN in FIG. 5, and assuming that the comparator LCOM has toggle TA1 set so that gate G*a*1 of the delay network LDN is primed, i.e., none of the delay elements DL1, DL2 or DL3 is connected in series with the incoming line LB. If incoming digits *p*1 . . . *p*8 now arrive progressively earlier relative to digits *t*1 . . . *t*8 generated by generator EPG, then eventually there will be a one digit period difference between writing and reading of the toggles T1 . . . T8 and the delay network will be adjacent the empty condition. The detector LDET responds to this condition by detecting coincidence of pulses *p*2, and *t*1 in gate GDS1 primed by the output *a*1 from the comparator unit toggle TA1. The output from gate GDS1 sets the toggle TD1, the output from which is applied over lead R1 to terminal ECR in the exchange equipment E and thence via the logic unit ECL (assuming there is no concurrent input at terminal ECA), as a frequency decreasing input to the oscillator EO. The output from toggle TD1 also primes gate GDS3 which, at digit period *t*7 of the next synchronising time slot *st*, generated by the pulse generator EPG, gates a "1" output pulse to line LA. At digit period *t*8 of the synchronising time slot *st*, the gate GDS4 is not primed on the input lead LD2 and hence applies no output pulse (i.e., applied an "0" pulse) to the line LA. Thus, in digit periods *t*7, *t*8 of the time slot *st*, of each time frame during which toggle TD1 remains set, a "10" coded pulse is sent to the remote end of the line (i.e., to incoming line LB of the line equipment at the remote end) and is operative to apply a frequency increasing input to the exchange oscillator at the remote end of the line.

Resultant changes in the frequency of the exchange oscillator EO, and any in the frequency of the exchange oscillator at the remote end of the line, result in an increasing delay between writing and reading of the toggles T1 . . . T8 in the delay unit LDN until, normally after several time frames have elapsed, the detector LDET detects coincidence between pulses *p*8 and *t*4 in gate GRS2 and applies a resetting input, via gate GRS1 to toggle TD1 (and also to toggle TD2). In its reset condition, the output from the toggle TD1 is removed from lead LD1. Resetting of the toggles TD1 and TD2 is subsequently confirmed by outputs *b*1, *a*2 and *b*2 (from the comparator unit toggles LB1, LA2, LB2 respectively) applied via gate GRS1, as the delay elements DL1, DL2, DL3 are inserted in series with the incoming line LB.

With all three delay elements inserted, and increasing difference between writing and reading times of the delay network toggles T1 . . . T8 (FIG. 5), gate GDS2, primed by output *a*3 from the comparator unit toggle TA3 (FIG. 5) detects coincidence between a *t*1 pulse and a *p*7 pulse, a condition of the delay network adjacent the full condition and applies a setting input to the toggle TD2. That toggle then applies an output on lead LD2 which is fed over lead A1 to terminal ECA as a frequency increasing signal to the control logic unit ECL. At digit period *t*8 of the synchronising time slot *st* of each time frame during which the toggle TD2 is set, the output of toggle TD2 is gated by gate GDS4 to the line LA as a "1" pulse (gate GDS3 having, at digit period *t*7 of those time slots *st* applied zero output, "0," to the line LA). Thus, in the synchronising time slot *st* of each of such time frames a "01" coded signal is transmitted to the far end of the line LA and fed to the exchange oscillator at that end as a frequency decreasing control signal.

Resultant changes in the frequencies of one or both the exchange oscillators at the ends of the line connecting them then decreases the delay between writing and reading of the delay network toggles T1 . . . T8 (FIG. 5) and eventually, normally after several time frames, coincidence between a *p*8 and a *t*4 pulse is again detected in gate GRS2 to reset the toggle TD2 via gate GRS1, this resetting being confirmed by inputs *b*2, *a*2, *b*1 from the comparator LCOM (FIG. 5) as the delay elements DL3, DL2, DL1 are removed.

Reverting now to the digital communication system shown in FIG. 1 and assuming that each of the exchange equipments AE, BE, CE, DE is similar to the equipment E shown in FIG. 2 and each line equipment AL, BL, CL, DL is similar to the line equipment as shown in FIG. 2, the operation of such a system in the event of various conditions affecting alignment of the frame starts of the several exchanges will be described. It will be assumed that initially (a) all the exchanges are operating normally,
(b) stable and mean temperature conditions of the interconnecting lines exist,
(c) the storage capacity in actual use of each variable delay network LDN approximates the capacity still available,
(d) the exchange equipment timing oscillators EO are all locked to the same operating frequency, and
(e) that none of the control logic units ECL of the exchange equipments is applying a control signal to its associated oscillator EO.

If now some disturbance causes the timing oscillator EO of exchange equipment DE temporarily to increase in frequency, the frame start of exchange D will be advanced causing an increase in the amount of delay provided by the network LDN of line equipment DL4 and a decrease in the amount of delay provided by the network LDN of line equipment CL4. One of these delay networks may reach the appropriate predetermined limiting condition before the other, dependent on the precise amount of delay in use immediately before the disturbance. Assuming that the delay network LDN of line equipment DL4 is the first to reach a limiting condition, in this case adjacent the empty condition then detection of this condition by the associated detector LD results in application of a retard signal to the control terminal ECR of exchange equipment DE so that the frequency of its oscillator EO is reduced and the frame start retarded. In addition, the control unit LFC1 of line equipment DL4 transmits a "10" signal (advance signal to the line equipment CL4 causing increase in frequency of the exchange oscillator EO of the exchange equipment CE and the frame start time is advanced. As a result of these changes in frequency of the oscillators EO of exchange equipments CE and DE, the detectors LD of the line equipments CL4 and DL4 no longer are actuated and the retard and advance signals are removed. Should the disturbance at exchange D persist, the above sequence will be repeated.

As a result of the frame start advance signal transmitted to line equipment CL4 of the exchange C, the delay provided by the networks LDN of line equipments CL2 and CL3 will be decreased and should be predetermined limiting conditions of those networks adjacent the empty conditions be reached, then advance signals will be sent to line equipments AL2 and BL3 of exchanges A and B, although not necessarily at the same time, and retard signals to the exchange equipment CE. Should this retard signal to the exchange equipment CE. Should this retard signal be applied to the terminal ECR concurrently with the advance signal transmitted from the exchange D, then the control logic unit ECL of exchange equipment CE will not apply a control signal to its associated oscillator EO and the frame start of exchange C will not be altered.

If exchanges A and B are connected via line equipments AL5 and BL6 to a further exchange or exchanges and advance and retard signals are concurrently transmitted to exchanges A and B from the additional exchanges and station C, then the oscillators EO of exchange equipments AE and BE will not be affected since the concurrent advance and retard signals neutralise each other. In addition, the frequency locking signals fed to the band pass filters EF of the exchange equipments AE and BE will not be passed since the oscillators EO of the exchanges directly connected to exchange A and B will have been changed from the normal frequency by 50 parts per million whereas the pass band of the filter EF only transmits changes of 5 parts per million. Thus, exchanges A and B receive neither frequency control nor frequency locking signals under these conditions. However, since a sinusoidal locking signal is transmitted between them over line L1, the delay networks LDN of line equipments AL1 and BL1 will operate within their available capacities.

It will thus be apparent that the provision of the sinusoidal locking signal serves chiefly to maintain exchanges such as A and B (which may both receive concurrent advance and retard signals), operating at the same frequency so that liens such as L1 may continue to operate during the period of concurrent reception of advance and retard signals oby both exchanges A and B.

In networks of exchanges of limited extent where the natural frequencies of the exchange oscillators are of sufficiently close tolerances and where sufficient margin is provided between the adjacent empty and adjacent full conditions and actual empty and full conditions in the delay networks LDN, it becomes apparent that the possible duration of concurrent advance and retard signals on neighbouring exchanges is limited and their natural drifts of frequency will not be sufficient to cause a line such as L1 to lose synchronisation during the period of concurrency. In these cases the sinusoidal locking signals and the filters EF are no longer necessary and a system relying solely on the advance and retard controlling signals is sufficient.

In the event of failure of an exchange in a network such as shown in FIG. 1 causing the frequency of its timing oscillator EO to be considerably in error, the bandpass filters EF of the exchange equipments prevent such a failure causing other exchanges in the network to fail. This is because the bandpass filter EF restricts the frequency range of sinusoidal locking signals injected to the exchange oscillators to a suitable narrow band, in the present example 5 parts per million.

If an exchange failure results in continuous transmission of a frequency advancing signal or a frequency retarding signal, then normal operation of the network would be prevented. Such conditions can be avoided by provision of a "timeout" facility so that such a control signal persisting for more than a predetermined time (say 500 ms.) would be disconnected.

In order to restart operation of an exchange after failure without adversely disturbing the remainder of the network, the lines to the other exchanges should be restored one at a time.

When an exchange is restarted it is possible that its frame start time will be sufficiently out of timing that the required delay in the delay network LDN is beyond the storage capacity provided, in which case a signal can be derived from the comparator unit to cause transmission over the link to be cut, whilst an advance or retard control signal is locally generated to adjust the frame start time.

Now, when the first link is connected control signals will be generated from one or both of the comparator units at the line ends and the exchange oscillators will be adjusted until the timing is such that the storage within the delay network can become adequate, at which time the control signals will be removed.

The removal of the control signals enables the second line to be connected and if necessary further control signals will cause further adjustments then enabling the third line to be connected. This process continues until all lines are connected. This is alawys possible provided that the range of storage provided in the delay network equipment is sufficient to compensate for the full temperature range of delay likely to be encountered on the lines.

If an additional exchange is added to a network of exchanges embodying the invention, or two such networks operating isochronously are interconnected, then the synchronising operations described with reference to FIGS. 1 and 2 will operate to prevent the resultant disturbance causing failure of any exchange during or following the connection.

From the foregoing description it will be seen that the invention provides synchronizing apparatus effective to maintain the frame starts of the switching stages of a digital communications network in alignment with each other. The frame start of each switching stage is controlled by a local timing oscillator normally locked by sinusoidal signals derived from the incoming digit p.r.f. but automatically advanced or retarded as necessary under control of the equipment used to adjust the delay provided by line equipment of that stage to maintain the alignment of incoming digits with the locally generated digit times. The synchronising apparatus described permits starting of a new oscillator in any switching stage, restarting an oscillator which has failed, addition of an additional switching stage to an operating network or the interconnection of two independent isochronous networks with minimal disturbance on the operation of the network(s).

The oscillator EO shown in FIG. 2 is assumed to be controlled, in response to incoming advance or retard signals from the logic control unit ECL, by control of capacitors or inductors in its frequency determining circuit(s) as is well known in the art. FIG. 7 shows an alternative arrangements utilising a variable motor driven capacitor in the frequency determining circuit of the oscillator EO' and a motor driven goniometer connected between the oscillator and the pulse generator EPG.

The outputs from the control logic unit ECL are connecter as control inputs to reversible motors M1 and M2, the former being coupled to drive a capacitor C in the frequency determining circuit of the oscillator LO and the latter being coupled to drive the goniometer G.

In the presence of an advance signal at the output of the control logic unit ECL, the motor M2 rotates the goniometer G in a sense to increase the frequency of the input to the pulse generator EPG for the duration of the advance signal. Rotation of the motor M1 by an advance signal from the control unit ECL adjusts the capacitor to effect a small increase in the natural frequency of the oscillator EO' which persists following removal of the advance signal. In response to a retard control signal from the unit ECL, the motor M2 decreases the input frequency to the pulse generator EPG for the duration of the retard signal and the motor M1 effects a decrease in the natural frequency of the oscillator EO′ which persists following removal of the retard signal. In the absence of an advance or a retard control output signal from the unit ECL, the goniometer remains stationary.

In a system according to the invention having exchange oscillator systems as shown in FIG. 7, any oscillator EO′ which has, over a period, received equal length periods of advance and retard control signals, will have received no permanent adjustment of its natural frequency due to rotation of the motor M1. Any oscillator EO′ that has a longer period of advance or retard control signals will receive an increase or decrease respectively, in its natural frequency due to rotation of its motor M1. Thus, the frequencies of all the oscillators in the system will be progressively adjusted towards a common frequency.

By providing one exchange in the system with an oscillator EO′, without a motor M1 and associated capacitor C, all the remaining oscillators will progressively be adjusted towards the frequency of that oscillator. Such an arrangement achieves, by direct injection into the oscillators EO′, a similar result as sinusoidal frequency locking derived from incoming digits to each exchange by the oscillators LCO of the line equipments EL of that exchange and applied to the oscillator EO via filter EF, as illustrated by FIG 2.

I claim:

1. A digital communications system including at least two switching stages joined by at least one transmission path, each stage having a master timing oscillator with an input control circuit, the frequency of said oscillator being adjustable by control signals applied to said control circuit, and the stage having for each said transmission path connected to it, digit storage means operable under control of the master timing oscillator and incoming digits on that said path to the stage temporarily to store said incoming digits thereby to absorb differences between incoming digit times and local digit times generated by said master timing oscillator, in which there is provided in each stage means responsive to the state of fill of the storage means approaching full and empty conditions thereof temporarily to apply, respectively, a frequency increasing or a frequency decreasing control signal to said input control circuit and to transmit to the said transmission path frequency decreasing or frequency increasing control signals, respectively, and means operable to receive from said transmission path frequency increasing or frequency decreasing control signals and to apply said received control signals to said input control circuit of said master timing oscillator, the said input control circuit of said master timing oscillator, the said input control circuit being operable to cause adjustment of the frequency of said oscillator only when one or more control signals of one sense are applied to the input circuit in the absence of a control signal of the opposite sense.

2. A system according to claim 1, in which each switching stage includes an outgoing control device operable to permit transmission of the said control signals to said transmission path until a predetermined normal operative condition of said storage means has been resumed.

3. A system according to claim 1, in which the said digit storage means is composed of a series of bistable elements each operable when in a given one of its two states to apply an input to an associated output gate, the said bistable elements each having an input gate operable by individual pulses occurring at times corresponding to respective incoming digit times to gate incoming digits to switch the bistable elements to the said given one of their two states, and the said output gates being operable by individual pulses occurring at respective local digit times to gate the said inputs from the bistable elements at times always subsequent to the said operation of the input gates, and means operable to switch the bistable elements from the said given one state to the other said state subsequent to said operation of the output gates.

4. A digital communication system according to claim 1 in which each said input control circuit includes means for inhibiting the adjustment of the frequency of the respective oscillator when different frequency control signals are present simultaneously.

5. A system according to claim 1 in which the production of the frequency control signals is terminated when a predetermined normal operative condition of the respective storage means has been resumed.

6. A digital communications system, including at least two switching stages joined by at least one transmission path, each stage having a local master timing oscillator operable to generate respective local channel time slots containing cycles of local digits, the oscillator including an adjustment circuit connected to receive control signals operable to adjust the frequency of the local digit times, the stage also including for each said transmission path connected thereto digit storage means connected to receive incoming cycles of digits occupying respective channel time slots incoming on said path to the switching stage and operable under control of said local digits and said incoming digits temporarily to store incoming digits and absorb differences between incoming digit times and corresponding local digit times, in which each stage also includes means operably responsive to coincidence of selected local digit times and selected incoming digit times corresponding to predetermined storage conditions of the storage means adjacent full and empty conditions thereof temporarily to apply, respectively, a frequency increasing or a frequency decreasing control signal to a gating circuit connected to the said adjustment circuit of the master timing oscillator and to transmit in selected outgoing channel time slots on said transmission path frequency decreasing or frequency increasing control signals, respectively, and means operable to receive from selected incoming channel time slots on said transmission path frequency increasing or frequency decreasing control signals and to feed said received control signals to said gating circuit, said gating circuit being operable to apply said control signals to the frequency adjustment circuit of said master timing oscillator only when at least one control signal of one sense is fed to the gating circuit in the absence of a control signal of the opposite sense.

7. A system according to claim 6, in which each stage includes an outgoing control signal gating arrangement operable under control of incoming digit pulses to the stage and said local digits to control transmission of said frequency increasing or decreasing control signals in said selected outgoing channel time slots, such that transmission is continued until a selected one of said incoming digit times is coincident with a selected one of said locally generated digit times which said coincidence corresponds to a predetermined normal operative condition of the said digit storage means.

8. A system according to claim 7, in which said digit storage means includes a series of bistable elements at least equal in number to the number of digits in a said channel time slot, said bistable elements having one state in which they apply inputs to respective output gates primed by pulses occurring at times corresponding to respective local digit times, incoming digits to the particular stage being applied to respective input gates having outputs which are connected as inputs to the respective bistable elements to set them to said one state and which input gates are primed by pulses occurring at times corresponding to respective incoming digit times to cause setting to said one state of the respective bistable elements at times in advance of said priming of the corresponding said output gates of the bistable elements, in which the said means responsive to the predetermined conditions of the digit storage means adjacent said full and empty conditions also includes means responsive to coincidence of selected local digit and incoming digit times corresponding to a predetermined normal operating capacity of the digit storage means, and in which the said application and transmission of frequency control signals is determined upon occurrence of this said latter digit time coincidence.

9. A system according to claim 6, in which the means operable to said received frequency increasing or frequency decreasing control singals from said selected incoming channel time slots includes means operable to increase the durations of said received control signals.

10. A system according to claim 6, in which each stage includes means connected to apply to the master timing oscillator frequency locking signals derived from said incoming digits to the stage.

11. In a digital communications system, a plurality of switching stages interconnected by transmission paths, each said switching stage including:

a local timing oscillator operable to generate respective channel time slots containing cycles of local digits and having adjustment means connected to receive control signals operable to adjust the frequency of the local digits, and for each said transmission path connected to the switching stage, means connected to receive in selected channel time slots on said transmission path frequency increasing and frequency decreasing control signals and to apply said received control signals to said adjustment means, a separate digit storage means, means operable under control of digits incoming to that stage on said incoming transmission path to insert said incoming digits into said storage means, and means operable under control of said local digits subsequently to remove said incoming digits from said storage means, in which each stage also includes means responsive to coincidence between selected local digit times and selected incoming digit times corresponding to predetermined storage conditons of said storage means adjacent full and empty conditions, to generate, respectively, frequency increasing or frequency decreasing control signals and to apply said control signals to said adjustment means, and concurrently to generate, respectively, frequency decreasing or frequency increasing control signals and to transmit said control signals in said selected channel time slots, only to the switching stage connected to the remote end of said transmission path, and in which the said adjustment means is operable to apply frequency control signals to said local timing oscillator only when a frequency control signal of one of said senses is fed to said adjustment means in the absence of a frequency control signal having the opposite of said senses.

12. A system according to claim 11, in which each said switching stage includes means operable to apply signals derived from digits incoming to that said stage to lock the frequency of the timing oscillator of that said stage with the frequencies of the said timing oscillators of the remaining said switching stage(s) in the system.

13. A system according to claim 11, in which the said frequency locking signals are operative to shift the frequency of the said local timing oscillator of a said switching stage by a relatively small predetermined amount and the said frequency increasing or decreasing control signals applied to the said local master timing oscillator of a said switching stage are operative to shift the frequency of said oscillator of said stage by a relatively large predetermined amount.

14. A digital communication system including at least two switching stages joined by at least one transmission path, each switching stage including a master timing oscillator with an input control circuit, the frequency of said oscillator being adjustable by the control signals applied to said control circuit, digit storage means for each transmission path connected to the particular stage, the storage means being operable under control of the master timing oscillator of the stage and responsive to digital signals incoming to the stage on the path temporarily to store the incoming digits so as to absorb differences in timing between the incoming digits and the local digit times determined by the master timing oscillator, in which there is provided for each digit storage means a respective means generating different frequency control signals when the state of fill of the digit storage means is approaching full and empty conditions, means for applying the frequency control signals to the input control signal of the master timing oscillator of the particular stage to increase or decrease the frequency of the oscillator and means for transmitting over the transmission path to the input control circuit of the switching stage at the remote end thereof tending to decrease or increase the frequency of the last-mentioned oscillator.

References Cited

UNITED STATES PATENTS

| | | | |
|---|---|---|---|
| 2,986,723 | 5/1961 | Darwin et al. | 179—15 |
| 3,050,586 | 8/1962 | Runyon | 179—15 |
| 3,158,864 | 11/1964 | Lehan | 179—15 XR |
| 3,306,978 | 2/1967 | Simmons et al. | 179—15 |

ROBERT L. GRIFFIN, Primary Examiner

CARL R. VON HELLENS, Assistant Examiner